United States Patent [19]

Swoveland

[11] Patent Number: 4,513,632

[45] Date of Patent: Apr. 30, 1985

[54] MOUNTING BRACKET FOR A STEERING COLUMN CONTROL STALK

[75] Inventor: Jack E. Swoveland, Laurinburg, N.C.

[73] Assignee: Dana Corporation, Toledo, Ohio

[21] Appl. No.: 570,766

[22] Filed: Jan. 16, 1984

[51] Int. Cl.³ .......................... H01H 9/00; B25G 3/28; A47H 1/14
[52] U.S. Cl. ............................... 74/484 R; 200/61.54; 248/251; 403/356; 403/365
[58] Field of Search ................... 74/484 R; 200/61.27, 200/61.54; 248/251; 403/361, 365, 356, 372, 354, 355

[56] References Cited

U.S. PATENT DOCUMENTS

| | | | |
|---|---|---|---|
| D. 256,575 | 8/1980 | Moore | D12/177 X |
| 1,212,709 | 1/1917 | Stephenson | 200/61.54 |
| 1,285,869 | 11/1918 | Wineman | 403/354 X |
| 1,716,204 | 6/1929 | Bickford et al. | 200/61.27 |
| 2,808,278 | 10/1957 | Snyder | 403/361 X |
| 2,818,293 | 12/1957 | Klein et al. | 403/272 |
| 3,334,201 | 8/1967 | Mutschler et al. | 200/61.54 X |
| 3,511,943 | 5/1970 | Kibler | 200/61.54 X |
| 3,740,083 | 6/1973 | Zenhausern | 403/372 X |
| 4,219,706 | 8/1980 | Koch et al. | 200/4 |

FOREIGN PATENT DOCUMENTS 2513050 10/1976 Fed. Rep. of Germany ... 200/61.54

OTHER PUBLICATIONS

Chrysler Mounting Bracket, Drawing, (FIGS. 1, 2, 3), undated.

*Primary Examiner*—Allan D. Herrmann
*Attorney, Agent, or Firm*—Richard S. MacMillan; David D. Murray

[57] ABSTRACT

An improved mounting bracket for a steering column mounted control stalk is disclosed. The bracket includes a generally flat base portion having an aperture formed therein for receiving a boss formed on the steering column. A hollow intermediate portion extends from the base portion and has an internal diameter at least equal to the internal diameter of the base portion aperture. A slot is formed in the base and intermediate portions for receiving a key formed on the steering column boss. A hollow end portion extends from an end of the intermediate portion opposite the base portion and has an internal diameter smaller than the internal diameter of the intermediate portion. The end portion further includes means for releasably engaging the steering column mounted control stalk. Means are provided for securing the base portion to the steering column.

4 Claims, 3 Drawing Figures

MOUNTING BRACKET FOR A STEERING COLUMN CONTROL STALK

BACKGROUND OF THE INVENTION

The present invention relates in general to vehicle steering column mounted control stalks and in particular to an improved mounting bracket for a multiple actuator control stalk.

Many modern automobiles and other vehicles are provided with a steering column mounted control stalk. Such a control stalk typically includes a plurality of slidable and rotatable switch actuators for controlling a multiplicity of functions in a vehicle with a minimum amount of operator manipulation. The utilization of mutliple actuator control stalks is desirable from both safety and comfort standpoints.

While such control stalks are commonplace in modern vehicles, their utilization is rare in older models. Many manufacturers now provide aftermarket devices of this type which are designed to be retrofitted onto older vehicles. However, with the vast number of vehicle models and types now in existence, it is quite difficult to provide a single control stalk which would be readily adaptable to most vehicles. Hence, most control stalk aftermarket devices are provided with a single predetermined end configuration which cooperates with an interchangeable mounting bracket for attachment to the particular vehicle steering column.

SUMMARY OF THE INVENTION

The present invention relates to an improved mounting bracket for a steering column mounted control stalk. The stalk includes a generally flat base portion having an aperture formed therein for receiving a boss formed on the steering column. A hollow intermediate portion extends from the base portion and has an internal diameter at least equal to the internal diameter of the base portion aperture. A slot is formed in the base and intermediate portions for receiving a key formed on the steering column boss. A hollow end portion extends from an end of the intermediate portion opposite the base portion and has an internal diameter smaller than the internal diameter of the intermediate portion. The end portion further includes means for releasably engaging the steering column mounted control stalk. Means are provided for securing the base portion to the steering column.

It is an object of the present invention to provide an improved mounting bracket for a steering column mounted control stalk.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
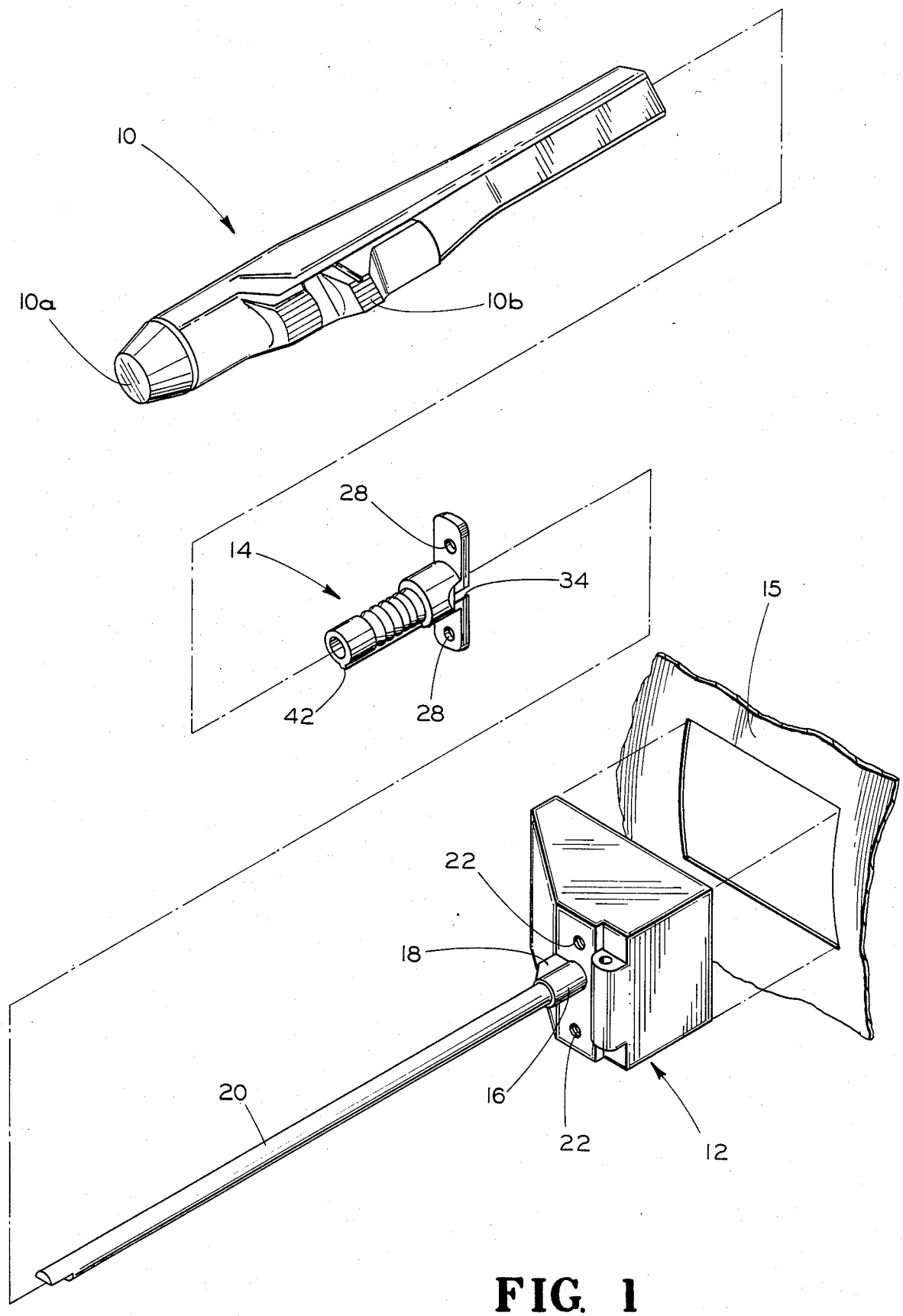
FIG. 1 is an exploded perspective view illustrating the manner in which a multiple function control stalk is mounted to a steering column switch assembly with an improved mounting bracket in accordance with the present invention.

Referring now to the drawings, there is illustrated in FIG. 1 an exploded perspective view illustrating the manner in which a conventional steering column mounted control stalk 10 is mounted on a conventional vehicle steering column switch assembly 12 by an improved mounting bracket 14 in accordance with the present invention. The control stalk 10 is conventional in the art and can include a plurality of switches, as shown at 10a and 10b, for controlling various functions, such as the speed and frequency of operation of the windshield wipers (not shown) of the vehicle. The switch assembly 12 can be a conventional two-speed wiper switch assembly secured within a steering column 15 of the vehicle. The switch assembly 12 includes an outwardly-extending cylindrical boss 16 having a flat, radially-extending key 18 formed thereon. A wiper control shaft 20 is provided which extends from the switch assembly 12 and through the cylindrical boss 16 and is adapted to be rotated in a known fashion to control the operation of the windshield wipers (not shown) of the vehicle. A pair of threaded apertures 22 are formed in the switch assembly 12 to receive appropriate threaded fasteners (not shown).

Figures 2, 3:
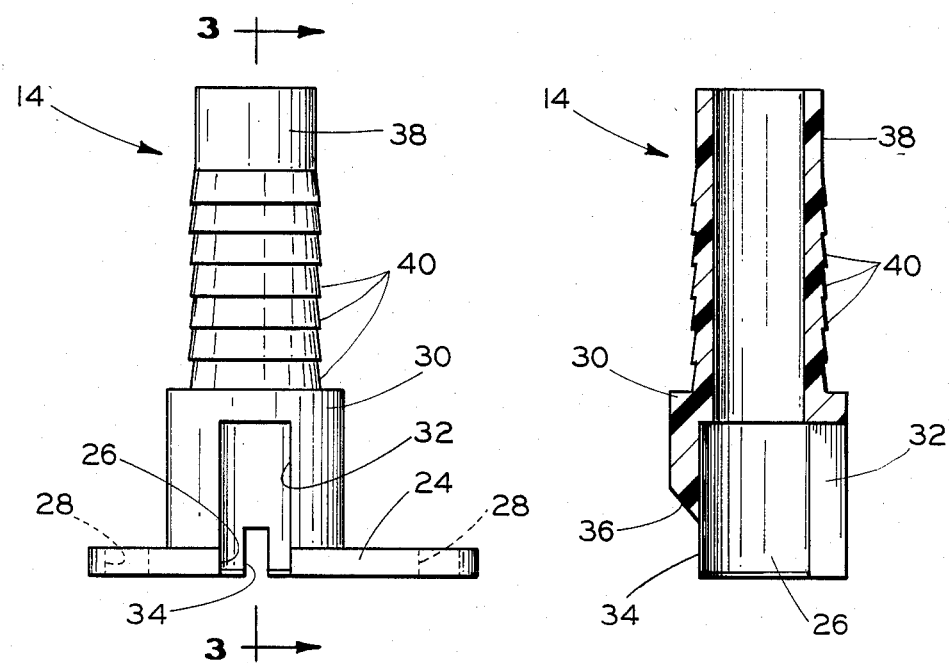
FIG. 2 is a side elevational view of the mounting bracket of FIG. 1.
FIG. 3 is a sectional elevational view taken along line 3—3 of FIG. 2.

FIGS. 2 and 3 more clearly illustrate the structure of the mounting bracket 14. The mounting bracket 14 is typically formed of a relatively stiff plastic or nylon glass fiber filled material, although other materials, such as zinc, can be utilized. The mounting bracket 14 includes a generally flat base portion 24 having a central circular aperture 26 formed therein for receiving the steering column boss 16. The base portion 24 further includes two smaller apertures 28 formed in the ends thereof which, together with the above-described threaded apertures 22 and threaded fasteners (not shown), provide a means for securing the base portion 24 of the mounting bracket 14 to the switch assembly 12.

A hollow intermediate portion 30 extends from one flat surface of the base portion 24. The intermediate portion 30 is generally cylindrical in shape and has an internal diameter at least equal to the internal diameter of the aperture 26 of the base portion 24. A slot 32 is formed in the base portion 24 and the intermediate portion 30 and extends parallel to the longitudinal axis of the intermediate portion 30 on one side of the mounting bracket 14. The slot 32 is sized to receive the key 18 formed on the steering column boss 16 snugly therein. Another slot 34 can be formed in the base portion 24 and the intermediate portion 30 parallel to the slot 32 on the opposite side of the mounting bracket 14. The slot 34 is formed by removing a portion of the wall of the intermediate portion 30 on one side of a plane perpendicular to the flat surfaces of the base portion 24. The end of the slot 34 opposite the base portion 24 can be tapered as at 36 toward the base portion 24 from the outside wall to the inside wall of the intermediate portion 30. The slot 34 and tapered portion 36 are provided to permit sufficient clearance for the mounting bracket 14 within the typically narrow confines of the switch assembly 12. It will be appreciated that the bracket 14 can also be mounted to a similar type switch assembly 12 which does not include the cylindrical boss 16 and the radially-extending key 18.

A hollow end portion 38 extends from the end of the intermediate portion 30 opposite the base portion 24.

The end portion 38 is generally cylindrical in shape and has an internal diameter smaller than the internal diameter of the intermediate portion 30. The end portion 38 further includes means for releasably engaging the steering column mounted control stalk 10. In the illustrated embodiment, such means includes a plurality of annular inclined surfaces 40 having a ramp-like configuration when viewed in cross-section. The inclined surfaces 40 are adapted to frictionally engage the hollow interior surface of the control stalk 10. If desired, a key 42 (see FIG. 1) can be formed on the exterior surface of the end portion 38 to cooperate with a keyway (not shown) formed in the hollow end portion 38 of the control stalk 10 so as to properly orient the control stalk 10 when it is mounted on the switch assembly 12. Although the aperture 26, intermediate portion 30, and end portion 38 are described and illustrated as being circular in cross section, it will be appreciated that the shapes of the elements can be varied if desired.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

What is claimed is:

1. An improved mounting bracket for a vehicle steering column mounted control stalk, the steering column including an outwardly-extending boss having a key formed thereon, comprising:

a generally flat base portion defining an aperture having a first inner diameter and adapted to receive said steering column boss;

an intermediate portion extending from a flat surface of said base portion, said intermediate portion defining a first passageway having a second inner diameter at least equal to said first inner diameter of said aperture of said base portion;

a first slot formed in said base and intermediate portions adapted to receive said steering column key and extending axially co-extensively with said aperture and said first passageway;

a second slot formed in said base and said intermediate portions opposite said first slot, said second slot being smaller in size than said first slot;

an end portion extending from an end of said intermediate portion opposite said base portion, said end portion defining a second passageway having an inner diameter smaller than said second inner diameter of said intermediate portion, said end portion further including means for releasably engaging said steering column mounted control stalk; and means for securing said base portion to said steering column.

2. The invention defined in claim 1 wherein said intermediate portion has an outer surface and further including a tapered portion formed in said outer surface of said intermediate portion near said second slot.

3. The invention defined in claim 1 wherein said means for releasably engaging the steering column mounted control stalk includes a plurality of annular inclined surfaces having a ramp-like configuration formed on an exterior surface of said end portion.

4. The invention defined in claim 3 wherein said end portion further includes a key formed on said exterior surface thereof.

* * * * *